United States Patent
Mitsuzuka

[11] Patent Number: 6,147,416
[45] Date of Patent: Nov. 14, 2000

[54] ROTATABLE CONNECTOR WITH TURNING ANGLE DETECTING FUNCTION

[76] Inventor: Katusya Mitsuzuka, c/o Alps Electric Co., Ltd., 1-7 Yukigaya, Otsuka-cho, Ota-ku, Tokyo, Japan

[21] Appl. No.: 09/211,362

[22] Filed: Dec. 14, 1998

[30] Foreign Application Priority Data

Dec. 25, 1997 [JP] Japan ................................. 9-357548

[51] Int. Cl.⁷ .................................................... G01B 7/30
[52] U.S. Cl. .................... 307/10.1; 200/61.54; 336/120; 336/DIG. 2; 439/950
[58] Field of Search ................................. 307/10.1, 104, 307/17; 200/61.54; 336/115, 117, 118, 120, DIG. 2; 73/862.339; 280/735; 439/950

[56] References Cited

U.S. PATENT DOCUMENTS

| | | | |
|---|---|---|---|
| 4,766,326 | 8/1988 | Hayashi et al. ...................... | 200/61.54 |
| 5,347,256 | 9/1994 | Yumiki et al. ........................... | 336/120 |
| 5,442,956 | 8/1995 | Persson ................................. | 73/862.239 |
| 5,498,911 | 3/1996 | Bossler et al. .......................... | 307/10.1 |
| 5,636,863 | 6/1997 | Reid et al. .............................. | 280/735 |
| 5,856,710 | 1/1999 | Baughman et al. ..................... | 307/10.1 |

*Primary Examiner*—Albert W. Paladini
*Attorney, Agent, or Firm*—Brinks Hofer Gilson & Lione

[57] ABSTRACT

A rotatable connector with a turning angle detecting function wherein two concentric housing grooves are formed on the opposite surfaces of a stator core and a rotor core which face each other across an air gap; the coils being housing in the housing grooves; there are formed projection-depression portions which have projections and depressions alternately formed continuously at a specific pitch along the circumferential direction on both sides of outer coil pair; and a signal is transmitted from the stationary side to the movable side via the inner coils of the stator core and the rotor core, to thereby generate an angle signal by utilizing a change in magnetic resistance between the projection-depression portions in synchronization with the rotation of the rotor core.

10 Claims, 6 Drawing Sheets

ROTATABLE CONNECTOR WITH TURNING ANGLE DETECTING FUNCTION

BACKGROUND OF THE INVENTION

1. Field of the Invention

The present invention relates to a rotatable connector for electrically connecting an electric part such as an air bag inflator mounted on a steering wheel of an automobile to a steering column side, and more particularly to a rotatable connector having a turning angle detecting function for detecting the turning angle of the steering wheel.

2. Description of the Prior Art

Generally a rotatable connector is mounted, between the steering wheel and steering column of the automobile, for electrically connecting a horn switch and an air bag inflator installed on the steering wheel to the steering column side. Recently, however, there has been adopted such a system that the turning angle of the steering wheel is detected by an angle sensor, and the damping force of the suspension and the shift position of an automatic transmission are controlled in accordance with information on turning from the angle sensor.

There has been known an assembly structure including an outer rotatable connector and an inner angle sensor which are both assembled in one body and arranged around the steering shaft. In this case, the rotatable connector is of such a structure that spiral cables are housed in a pair of casings; a rotating casing is connected with a rotor member which rotates integrally with the steering shaft, while a stationary casing is fixedly attached to a stator member of the steering column. The angle sensor consists of a resistance contact type rotary encoder; the moving plate thereof is formed integrally with the rotating casing of the rotatable connector, and the stationary plate is formed integrally with the stationary casing of the rotatable connector. Therefore, as the steering wheel is turned, the rotating casing of the rotatable connector and the moving plate of the angle sensor also turn in synchronization with the steering wheel, thereby maintaining electrical connection by the rotatable connector between the steering wheel and the steering column and further enabling detection of such information on turning as the turning angle and direction of the steering wheel by means of the angle sensor.

According to the above-described prior art technology, the angle sensor and the rotatable connector are arranged concentrically around the steering shaft, and therefore the rotatable connector can be reduced in thickness more than the prior art in which the angle sensor and the rotatable connector are stacked along the axial direction of the steering shaft. Contrarily, however, there exists such a problem that the size in the diametral direction increases. Furthermore, the angle sensor and the rotatable connector are integrally assembled as a single assembly structure; however, before thus assembling into one body, the angle sensor and the rotatable connector are manufactured separately and therefore the number of component parts will increase, resulting in a complicated structure.

SUMMARY OF THE INVENTION

The present invention, therefore, has as an object the provision of a rotatable connector having an angle detecting function, in which a non-contact magnetic flux connection type rotary transformer is employed for electrical connection between the steering wheel and the steering column, and is provided with a projection-depression portion for generating a turning angle signal on the opposite surfaces of the rotor core and the stator core of the rotary transformer. According to the rotatable connector thus constituted, it is possible to use a rotary transformer having both functions of signal transmission and angle detection, thereby realizing a decreased number of components and production of small, thin components.

The rotatable connector of the present invention having the turning angle detecting function includes a rotor core which rotates in synchronization with the steering wheel of the automobile, a ring-shaped coil arranged in the rotor core, a stator core arranged oppositely to the rotor core through the air gap, and a ring-shaped coil arranged in the stator core, and is provided with a projection-depression portion extending circumferentially along the coil on the opposite surfaces of both the rotor and stator cores.

In the rotatable connector, a non-contact magnetic flux connection type rotary transformer is adopted for electrical connection between the steering wheel and the steering column; and the turning angle of the steering wheel is detected by changing magnetic resistance between the projection-depression portions formed on one pair of cores of the rotary transformer. Therefore it is possible to realize the rotatable connector with angle detecting function that has been decreased both in diametral direction and in the direction of thickness, and accordingly to simplify the structure of the rotatable connector.

At least one pair of coils of the rotor core and the stator core are sufficient to perform signal transmission from the stator side to the rotor side and detection of an angle signal on the rotor side. However, the ac voltage inputted into one coil of the stator core can be fed back to one of the other coil of the stator core through two coils of the rotor core by arranging two or more pairs of coils in the diametral direction of both cores and also by providing the projection-depression portion along at least one pair of coils. It is therefore possible to process, on the stator side, the angle signal generated by the projection-depression portion.

Furthermore, in a rotatable connector having two or more pairs of coils, when there is provided a phase difference between the projection-depression portion formed along a pair of coils and the projection-depression portion formed along the other pair of coils, two angle signals having a specific phase difference are outputted from the two pair of coils, and therefore it is possible to decide the absolute position of the steering wheel from these angle signals.

The above and other objects, features and advantages of the present invention will become clearer from the following description with reference to the accompanying drawings.

DESCRIPTION OF THE PREFERRED EMBODIMENTS

Figure 1:
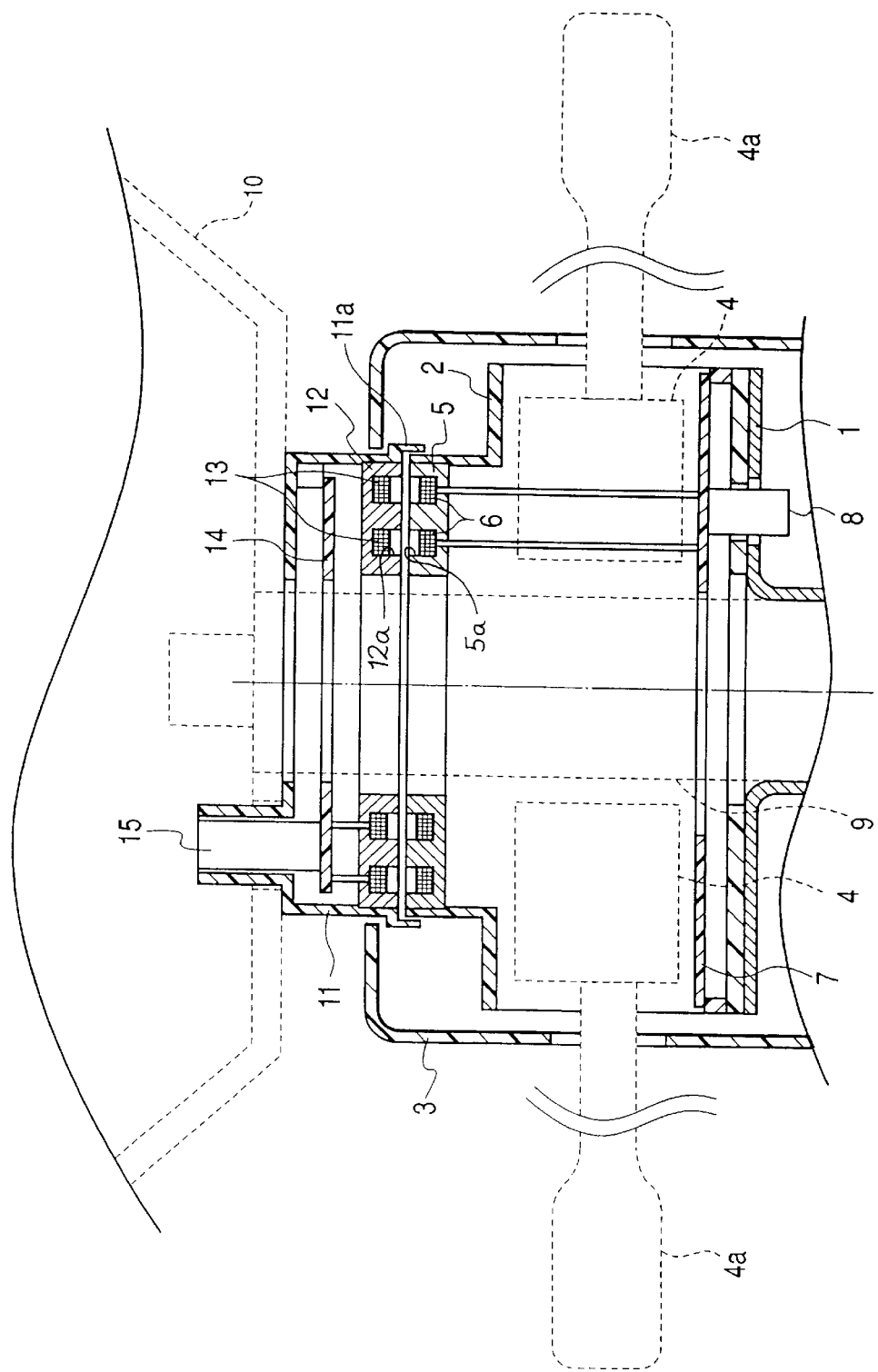
FIG. 1 is a sectional view showing one embodiment of a rotatable connector with turning angle detecting function according to the present invention which is built in a steering system.
Figure 2:
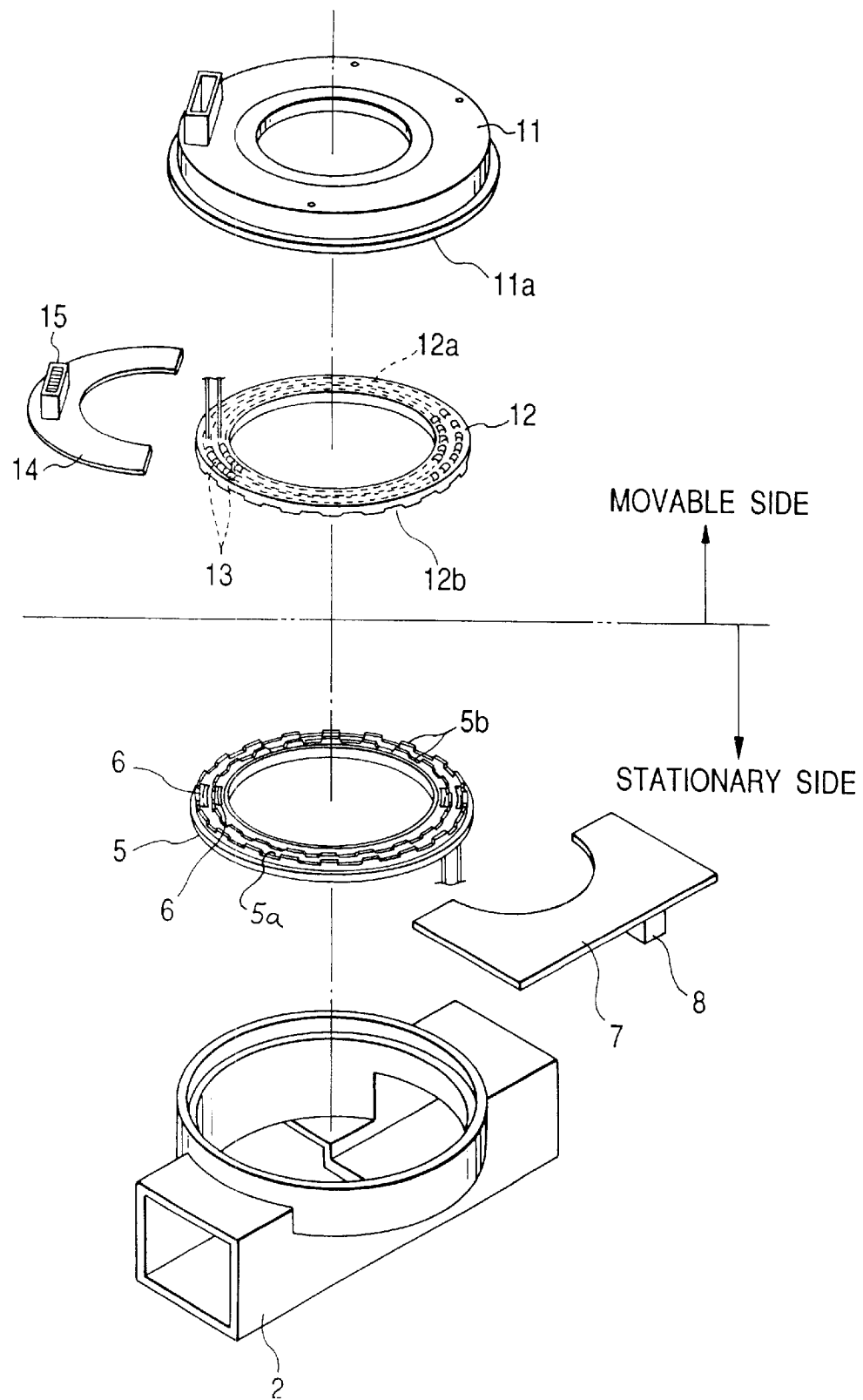
FIG. 2 is an exploded perspective view showing a major portion of the rotatable connector of FIG. 1.
Figure 3:
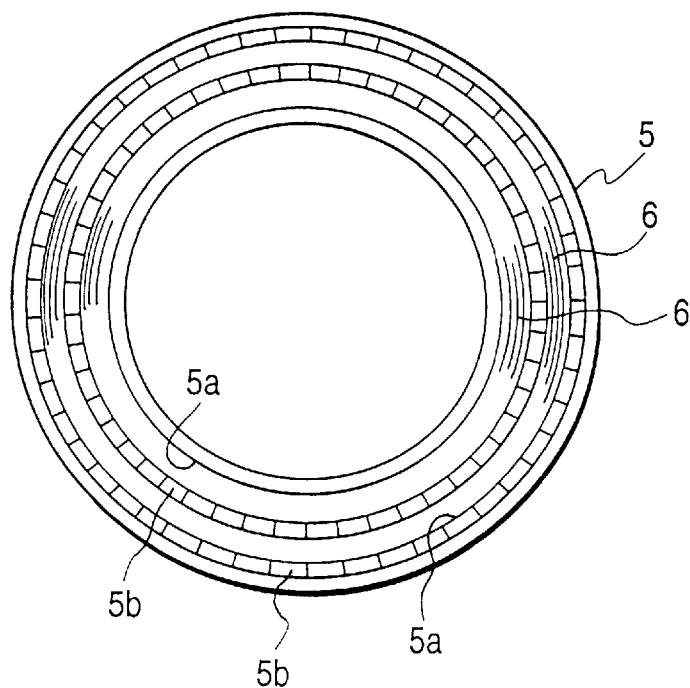
FIG. 3 is a plan view of a stator core disposed in the rotatable connector of FIG. 1.
Figure 4:
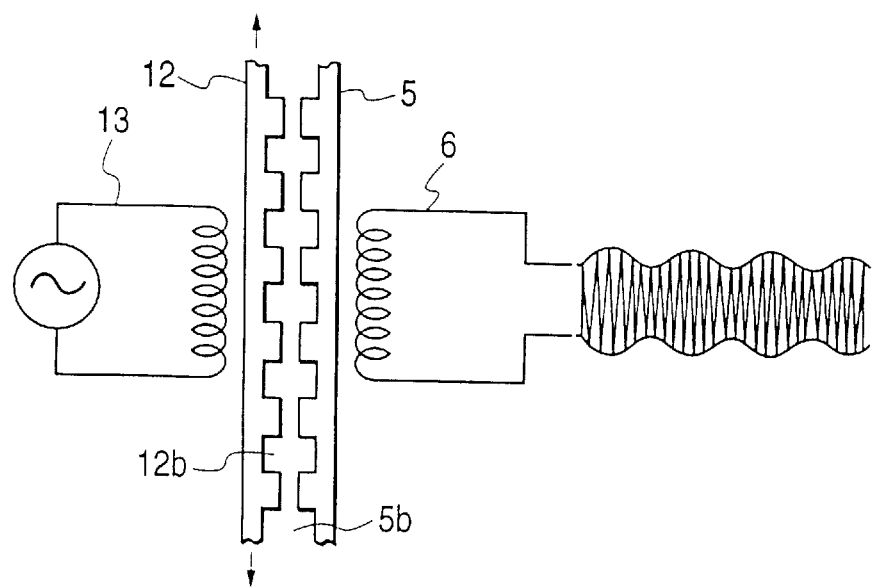
FIG. 4 is an explanatory view showing the principle of angle signal detection.

Preferred embodiments of a rotatable connector with a turning angle detecting function will be described with reference to the accompanying drawings. FIG. 1 is a sectional view showing the first embodiment of the rotatable connector with a turning angle detecting function assembled in the steering system; FIG. 2 is an exploded perspective view showing a major component of the rotatable connector of FIG. 1; FIG. 3 is a plan view of a stator core disposed in the rotatable connector of FIG. 1; and FIG. 4 is an explanatory view showing the principle of angle signal detection.

As shown in FIG. 1 and FIG. 2, a housing 2 is attached on a steering column 1 which is a stator member of the steering system. The housing 2 is covered with a column cover 3. In the housing 2 are housed a pair of stalk switches. An operating lever 4a of these stalk switches protrude out through the column cover 3. At the upper opening end of the housing 2, a ring-shaped stator core 5 is fixedly mounted. The stator core 5 is produced of a ferromagnetic ferrite material. Two housing grooves 5a which are concentrically arranged are formed on the upper surface of the stator core 5. Within each housing groove 5a, a coil 6 wound by a specific number of turns is housed. On either side of the outer housing groove 5a, as shown in FIG. 3, a projection-depression portion is formed with projections and depressions alternately continuing at a specific pitch. The projection-depression portion 5b extends along the circumferential direction in which the outer coil 6 is wound. The coils 6 are connected to a printed-circuit board 7 mounted on the inside bottom surface of the housing 2 through leadwires, FPCs, etc. and then are collected to a connector unit 8 of the printed-circuit board 7. The members explained above are arranged around the steering shaft 9. All these members are mounted on the stationary side.

A steering wheel 10 is fixedly mounted by a nut on the upper end of the steering shaft 9. On this steering wheel 10 is fixedly attached a cover 11 by a screw. On the lower outer peripheral edge of the cover 11 a skirt portion 11a is formed. The skirt portion 11a is axially overlapped on the upper outer peripheral edge of the housing 2, thereby preventing entry of foreign substances like dust into the housing 2. At the lower opening end of the cover 11, a ring-shaped rotor core 12 is fixed. The rotor core 12 is also produced of a ferromagnetic ferrite material. In the lower surface of the rotor core 12 two housing grooves 12a are concentrically formed. A coil 13 wound by a specific number of turns is housed within each housing groove 12a. On either side of the outer housing groove 12a a projection-depression portion 12b having projections and depressions alternately formed continuously at a specific pitch is also formed. The projections and depressions of the projection-depression portion 12b and the projection-depression portion 5b are set at the same pitch. Both coils 6 of the stator core 5 and both coils 13 of the rotor core 12 face each other across an air gap. The rotary transformer is comprised of these stator core 5, rotor core 12, and two pairs of coils 6 and 13. The coils 13 are connected to the printed-circuit board 14 disposed in the cover 11 via leadwires, FPCs, etc., being collected to a connector unit 15 on the printed-circuit board 14 and then being connected to unillustrated electrical parts mounted on the steering wheel 10. In the present embodiment, the inner coil 13 is connected with an explosion circuit for operating the air bag inflator, while the outer coil 13 is connected with the inner coil 13. The members such as the cover 11 and the rotor core 12 are all movable members arranged around the steering shaft 9 and turn in synchronization with the turning of the steering wheel 10.

In the above-described constitution, the inner coil 6 of the stator core 5 is supplied with the ac voltage of specific frequency (e.g., 1 MHz), so that the secondary current frequency is outputted from the coil 6, i.e., the primary coil, to the inner coil 13 of the rotor core 12, notwithstanding the rotary motion of the steering wheel 10. Therefore, in the event a shock sensor has operated, an air bag signal (e.g., 300 KHz) is superposed on the specific frequency, and is sent from the stationary side to the movable side via the inner coils 6 and 13, thereby enabling initiating the air bag explosion circuit mounted on the steering wheel 10.

Since the inner coil 13 of the rotor core 12 is connected with the outer coil 13, the secondary current frequency is outputted from the outer coil 13 as the primary coil to the outer coil 6 of the stator core 5. In this case, with the turn of the rotor core 12 synchronously with the steering wheel 10, the magnetic resistance between the projection-depression portions 5b and 12b disposed along the outer coil pair 6 and 13 varies with the operation cycle of the projections and depressions. Therefore, as shown in FIG. 4, the amplitude of the secondary current frequency outputted from the outer coil 6 of the stator core 5 sinusoidally varies at the cycle of the projections and depressions. Therefore, it is possible to output an incremental signal by generating the waveform of the secondary current frequency by the signal processing circuit on the stationary side, and to detect the turning angle of the steering wheel 10 in accordance with the output signal.

Figure 5:
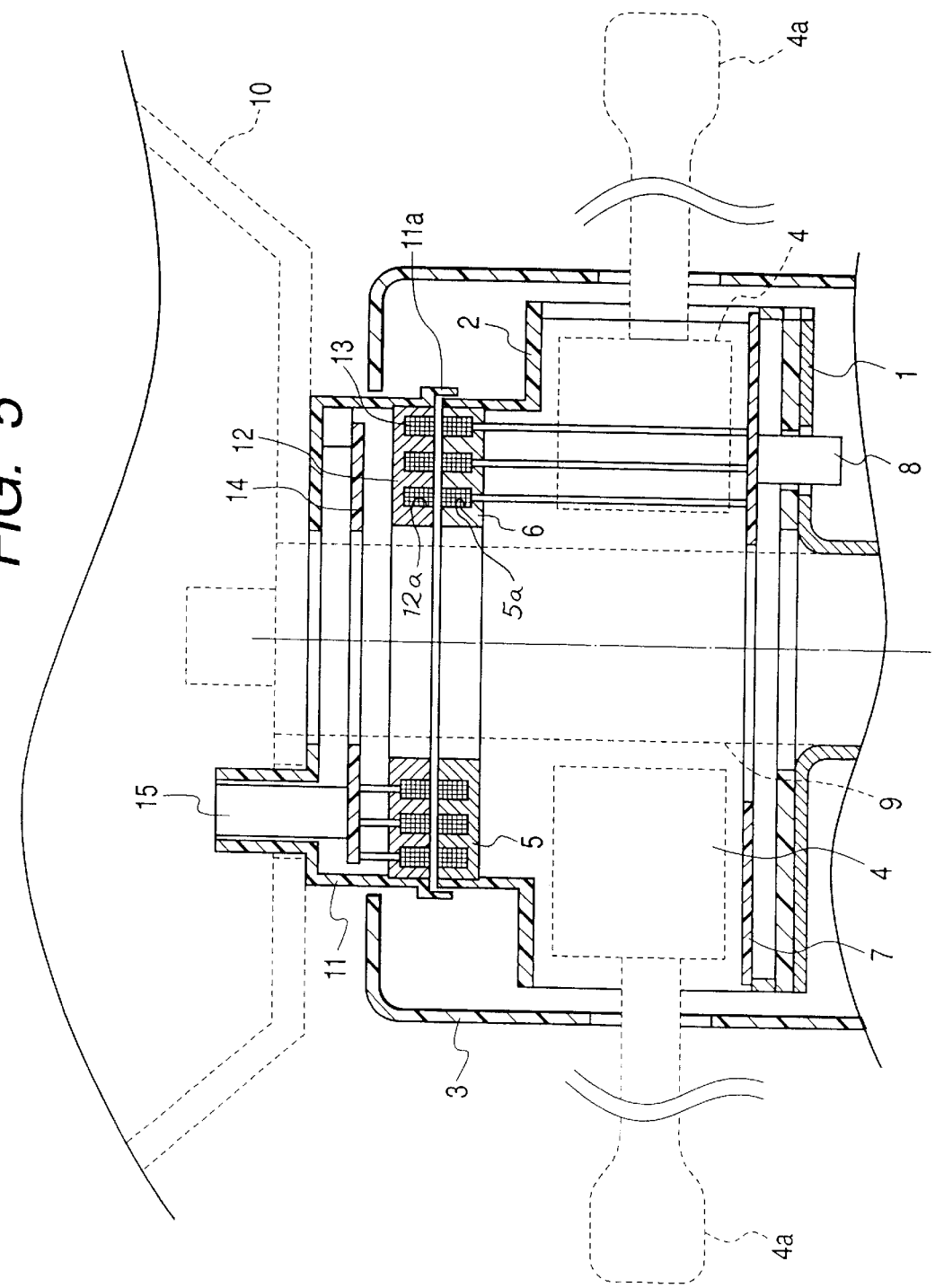
FIG. 5 is a sectional view showing a second embodiment of the rotatable connector with turning angle detecting function according to the present invention which is built in the steering system.
Figure 6:
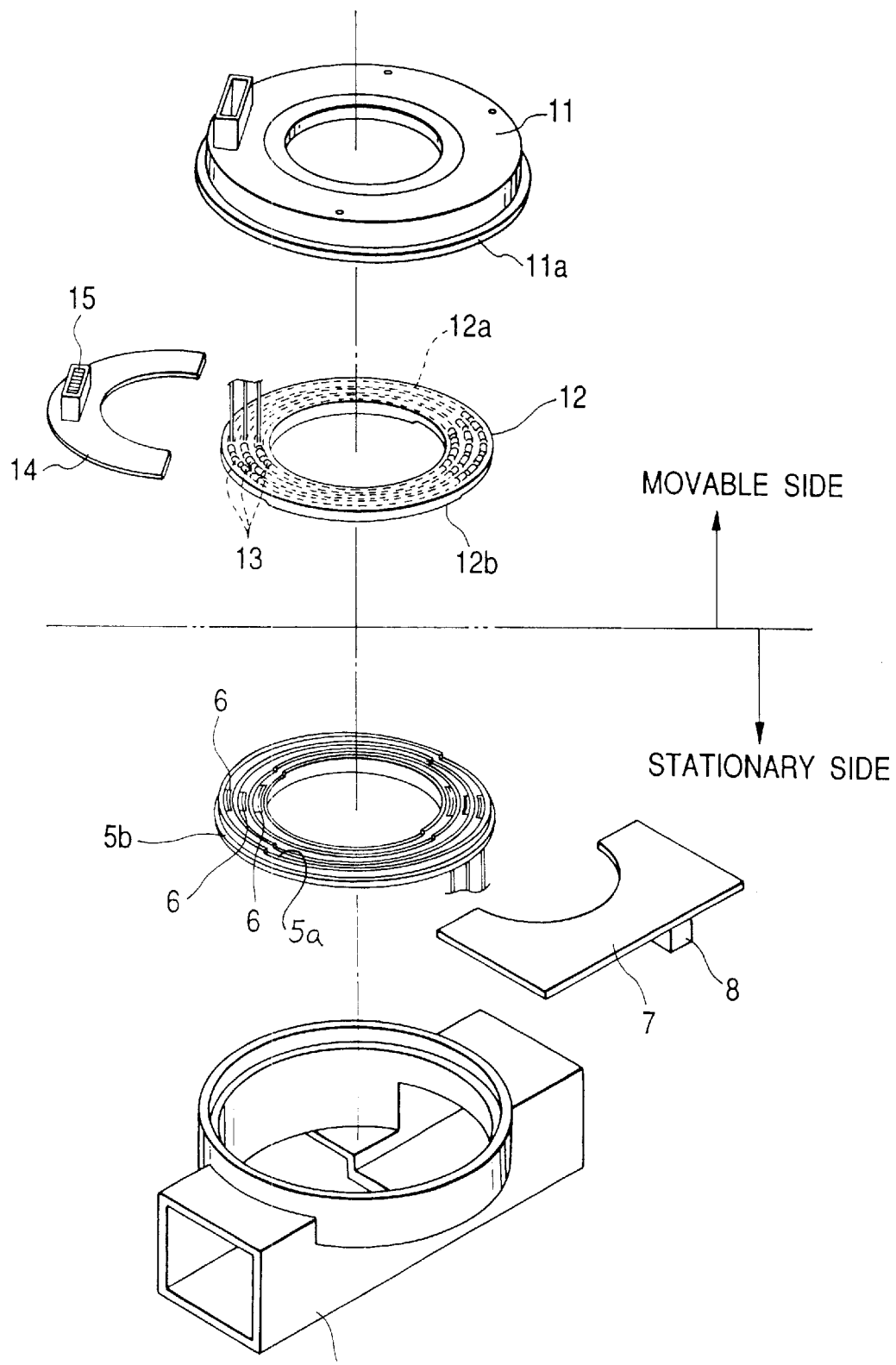
FIG. 6 is an exploded perspective view showing a major portion of the rotatable connector of FIG. 5.
Figure 7:
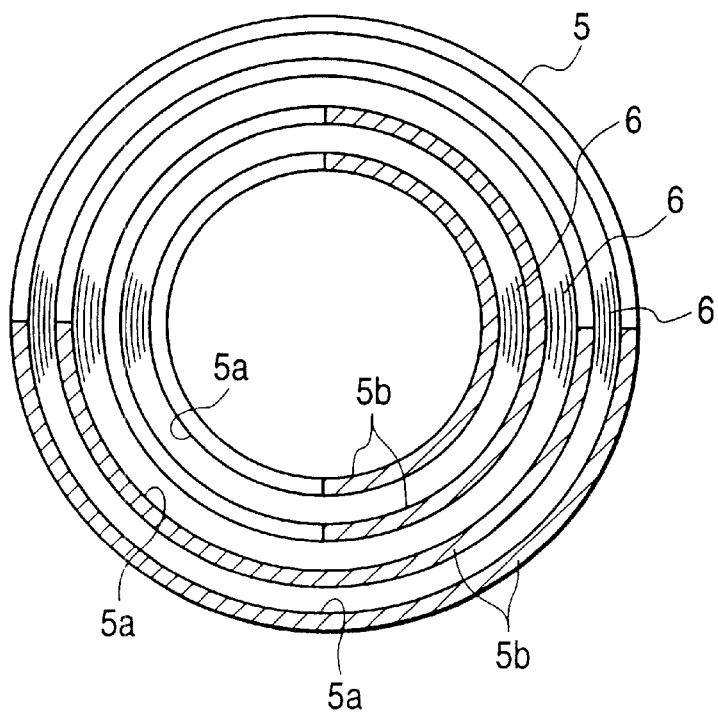
FIG. 7 is a plan view of the stator core disposed in the rotatable connector of FIG. 5.
Figure 8:
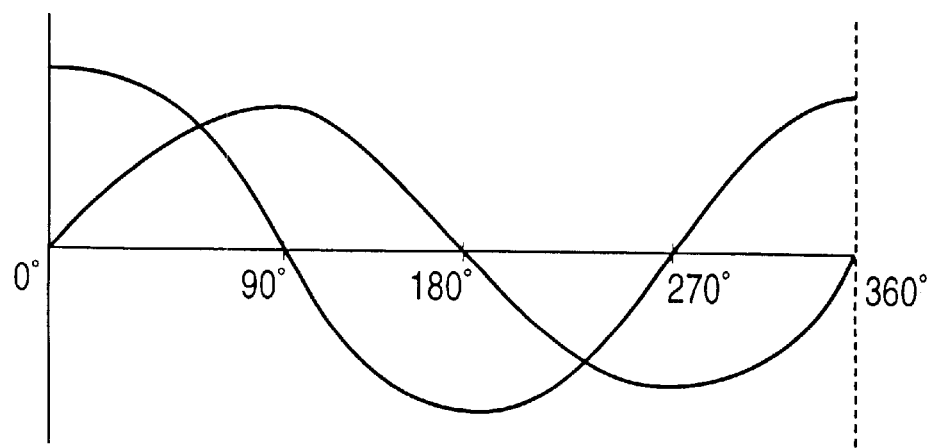
FIG. 8 is an explanatory view of an angle signal outputted from the coil.

FIG. 5 is a sectional view showing the second embodiment of the rotatable connector with a turning angle detecting function according to the present invention which is built in the steering system; FIG. 6 is an exploded perspective view showing a major part of the rotatable connector of FIG. 5; FIG. 7 is a plan view of the stator core provided in the rotatable connector of FIG. 5; and FIG. 8 is an explanatory view of an angle signal to be outputted from the coil. It should be noticed that the same members as those shown in FIGS. 1 to 4 are designated by the same reference numerals and are not described to prevent redundancy.

A difference of the present embodiment from the first embodiment lies in that three pairs of coils 6 and 13 are arranged in either of the stator core 5 and the rotor core 12; and the projection-depression portions 5b and 12b formed long the inner and outer coils 6 and 13 are provided with a phase difference. Other respects of the constitution are basically the same. That is, as shown in FIG. 6, there is formed the projection-depression portion 5b having projections and depressions (e.g., as shown in FIG. 7, projections in the hatched section and depressions in the non-hatched section) formed continuously at intervals of 180 degrees along both sides of the inner and outer housing grooves 5a. The projections and depressions of the two outer projection-depression portions 5b are 90 degrees out of phase in the circumferential direction in relation to the two inner projection-depression portions 5b. On both sides of the inner and outer housing grooves 12a of the rotor core 12, an entirely similar projection-depression portion 12b is formed and the central coil 13 is connected to the explosion circuit and also to the inner and outer coils 13.

In the above-described constitution, the ac voltage of a specific frequency (e.g., 1 MHz) is inputted to the central coil 6 of the stator core 5. Notwithstanding the turning operation of the steering wheel 10, the secondary current frequency is outputted from the coil 6 as the primary coil to the central coil 13 of the rotor core 12. Therefore, an air bag signal (e.g., 300 KHz) is superposed on the specific frequency similarly to the first embodiment, thereby enabling transmitting the air bag signal from the stationary side to the movable side via the central coils 6 and 13 and also operating the explosion circuit mounted in the steering wheel 10.

Furthermore, since the central coil 13 of the rotor core 12 is connected with the inner and outer coils 13, the secondary current frequency is outputted to the inner and outer coils 6 of the stator core 5 with the inner and outer coils 13 as the primary coils. At this time, when the rotor core 12 turns in synchronization with the steering wheel 10, the magnetic resistance between the projection-depression portions 5b and 12b formed along the inner and outer coil pairs 6 and 13 varies with the operation cycle of the projections and depressions. Therefore, as shown in FIG. 8, the sinusoidal secondary current frequency which is 90 degrees out of phase is outputted from the inner and outer coils 6 of the stator core 5. Therefore it is possible to detect the turning angle, the direction of turn, and the absolute position within the range of 360 degrees of the steering wheel 10 in accordance with these two incremental signals having the phase difference.

It is to be noted that the coil pairs 6 and 13 disposed in the stator core 5 and the rotor core 12 are not limited to each of the embodiments, and may be increased or decreased when needed. For example, when a pair of coils 6 and 13 are mounted in the stator core 5 and the rotor core 12 respectively, it suffices if an air bag signal is transmitted from the stationary side to the movable side by utilizing the coil pairs 6 and 13, and an angle signal is generated and transmitted from the movable side to the stationary side by means of a time-division multiplexing system using a light receiving-emitting element or an FM multiplexing system.

The present invention, therefore, is executed in the embodiments as heretofore explained above and has the following advantages.

The rotatable connector with the turning angle detecting function is comprised of the rotor core which rotates in synchronization with the steering wheel of the automobile, a ring-shaped coil arranged in the rotor core, a stator core arranged oppositely to the rotor core through the air gap, and a ring-shaped coil arranged in the stator core, and is provided with a projection-depression portion circumferentially extending along the coil on the opposite surfaces of both the rotor and stator cores. In the rotatable connector, a non-contact magnetic flux connection type rotary transformer is adopted for electrical connection between the steering wheel and the steering column; and the turning angle of the steering wheel is detected by changing magnetic resistance between the projection-depression portions formed on one pair of cores of the rotary transformer. It is, therefore, possible to realize the rotatable connector with angle detecting function that has been decreased both in diametral direction and in the direction of thickness, and accordingly to simplify the structure of the rotatable connector.

Furthermore, the provision of two or more pairs of coils on the rotor core and the stator core and the projection-depression portion at least along a pair of coils can feed back the ac voltage inputted into one coil of the stator core to the other coil of the stator core via two coils of the rotor core. It is, therefore, possible to process angle signals generated by the projection-depression portion on the stator side.

Furthermore, when two or more coils are employed, the provision of the projection-depression portion disposed along a pair of coil and the projection-depression portion disposed along the other coil pair with a phase difference, two angle signals with a specific phase difference are outputted from two pairs of coils. Therefore the absolute position of the steering wheel can be determined from these angle signals.

What is claimed is:

1. A rotatable connector with a turning angle detecting function comprising:
   a rotor core turning in synchronization with a steering wheel of an automobile;
   a ring-shaped coil disposed on said rotor core;
   a stator core disposed oppositely to said rotor core across an air gap;
   and a ring-shaped coil disposed on said stator core,
   wherein a protection-depression portion is circumferentially provided parallel with said coil on said rotor core, and a projection-depression portion is circumferentially provided parallel with said coil on said stator core.

2. A rotatable connector with a turning angle detecting function according to claim 1, wherein two or more pairs of said coils are disposed on said rotor core and said stator core, and said projection-depression portions are mounted along at least one pair of said coil.

3. A rotatable connector with a turning angle detecting function according to claim 1, wherein two or more pairs of said coils are disposed on said rotor core and said stator core, said projection-depression portions are provided along at least two pairs of said coils, and said projection-depression portion is provided with a phase difference.

4. A rotatable connector with a turning angle detecting function according to claim 1, wherein said rotor core and said stator core are formed of a ferromagnetic ferrite.

5. A rotatable connector with a turning angle detecting function according to claim 1, wherein said rotor core and said stator core has a housing groove formed of a plurality of ring-shaped walls for housing said ring-shaped coils.

6. A rotatable connector with a turning angle detecting function according to claim 5, wherein a turning angle detecting coil is housed in said housing groove which is formed of said two ring-shaped walls both having said projection-depression portion.

7. A rotatable connector with a turning angle detecting function according to claim 5, wherein an air bag signal detecting coil is housed in said housing groove formed of said two ring-shaped walls at least one of which does not have said projection-depression portion.

8. A rotatable connector with a turning angle detecting function according to claim 3, wherein three pairs of said coils are employed; and an air bag signal is transmitted to a pair of said coils located at center in a diametral direction.

9. A rotatable connector with a turning angle detecting function according to claim 1, wherein the peripheral edge of said rotor core has a skirt portion extending to surround the peripheral edge of said stator core.

10. A rotatable connector with a turning angle detecting function according to claim 1, wherein a housing is provided under said stator core and a pair of stalk switches are housed in said housing.

* * * * *

UNITED STATES PATENT AND TRADEMARK OFFICE
CERTIFICATE OF CORRECTION

PATENT NO.   : 6,147,416
DATED        : November 14, 2000
INVENTOR(S)  : Katsuya Mitsuzuka It is certified that error appears in the above-identified patent and that said Letters Patent is hereby corrected as shown below:

Item -- [73] Assignee: Alps Electric Co., Ltd., Tokyo, Japan --.
Item "[76] Inventor:" change "Katusya" to -- Katsuya --;
   change "c/o Alps Electric Co., Ltd., 1-7 Yukigaya, Otsuka-cho, Ota-ku, Tokyo, Japan" to -- Miyagi-ken, Japan --.

Abstract,
Line 4, change "housing" to -- housed --.

Signed and Sealed this

Thirteenth Day of November, 2001

Attest:

*Attesting Officer*

NICHOLAS P. GODICI
*Acting Director of the United States Patent and Trademark Office*